US012691467B2

(12) United States Patent
Takagi et al.

(10) Patent No.: US 12,691,467 B2
(45) Date of Patent: Jul. 28, 2026

(54) TRACK GENERATION DEVICE AND FLUID APPLICATION SYSTEM

(71) Applicants: DENSO CORPORATION, Kariya-city (JP); NATIONAL UNIVERSITY CORPORATION KANAZAWA UNIVERSITY, Kanazawa-city (JP)

(72) Inventors: Kazuki Takagi, Kariya-city (JP); Tomoaki Ozaki, Kariya-city (JP); Tokuo Tsuji, Kanazawa (JP); Takayuki Yamabe, Kanazawa (JP)

(73) Assignees: DENSO CORPORATION, Kariya-city (JP); NATIONAL UNIVERSITY CORPORATION KANAZAWA UNIVERSITY, Kanazawa-city (JP)

( * ) Notice: Subject to any disclaimer, the term of this patent is extended or adjusted under 35 U.S.C. 154(b) by 421 days.

(21) Appl. No.: 18/515,093

(22) Filed: Nov. 20, 2023

(65) Prior Publication Data

US 2024/0165654 A1 May 23, 2024

(30) Foreign Application Priority Data

Nov. 22, 2022 (JP) ................................. 2022-186707

(51) Int. Cl.
*B05C 11/10* (2006.01)
*B05C 5/02* (2006.01)

(52) U.S. Cl.
CPC ............ *B05C 11/1015* (2013.01); *B05C 5/02* (2013.01)

(58) Field of Classification Search
CPC ... B05C 11/1015; B05C 11/1021; B05C 5/02; B05C 5/0216; B25J 9/163; B25J 9/1679
See application file for complete search history.

(56) References Cited

U.S. PATENT DOCUMENTS

2007/0000442 A1 1/2007 Schucker
2022/0193710 A1 6/2022 Kikuchi et al.

FOREIGN PATENT DOCUMENTS

CN 115254537 A 11/2022
JP H05104044 A * 4/1993
JP 2012045476 A * 3/2012 ......... B05C 11/1013

OTHER PUBLICATIONS

U.S. Appl. No. 18/515,081, filed Nov. 20, 2023, Track Generation Device and Fluid Application System, 39 pgs.

* cited by examiner

*Primary Examiner* — JaMel M Nelson
(74) *Attorney, Agent, or Firm* — Precision Patents, P.C.

(57) ABSTRACT

A track generation device generates a track of a fluid discharge unit that discharges a fluid for applying the fluid to a surface of an object along a target application track. The track generation device includes a storage unit and a track generation unit. The storage unit stores a time-series model indicating a relationship between the track of the fluid discharge unit and an application track of the fluid in consideration of behavior of the fluid due to a viscosity, and the relationship is learned based on an actual track of the fluid discharge unit and an actual application track of the fluid. The track generation unit is configured to generate the track of the fluid discharge unit corresponding to the target application track using the time-series model upon reception of the target application track.

11 Claims, 8 Drawing Sheets

TRACK GENERATION DEVICE AND FLUID APPLICATION SYSTEM

CROSS REFERENCE TO RELATED APPLICATION

The present application claims the benefit of priority from Japanese Patent Application No. 2022-186707 filed on Nov. 22, 2022. The entire disclosure of the above application is incorporated herein by reference.

TECHNICAL FIELD

The present disclosure relates to a track generation device configured to generate a track of a fluid discharge unit that discharges a fluid, and a fluid application system including the track generation device.

BACKGROUND

Conventionally, there has been known a discharge amount control device configured to detect a change in application speed of an application nozzle that discharges a fluid and control a discharge amount of the fluid based on the detected value.

SUMMARY

The present disclosure provides a track generation device configured to generate a track of a fluid discharge unit that discharges a fluid for applying the fluid to a surface of an object along a target application track. The track generation device includes a storage unit and a track generation unit. The storage unit stores a time-series model indicating a relationship between the track of the fluid discharge unit and an application track of the fluid in consideration of behavior of the fluid due to a viscosity, and the relationship is learned based on an actual track of the fluid discharge unit and an actual application track of the fluid. The track generation unit is configured to generate the track of the fluid discharge unit corresponding to the target application track using the time-series model upon reception of the target application track. The present disclosure also provides a fluid application system including the track generation device and the fluid discharge unit.

BRIEF DESCRIPTION OF DRAWINGS

Objects, Features and Advantages of the Present Disclosure Will Become Apparent from the Following Detailed Description Made with Reference to the Accompanying Drawings. In the Drawings.

DETAILED DESCRIPTION

Figure 1:
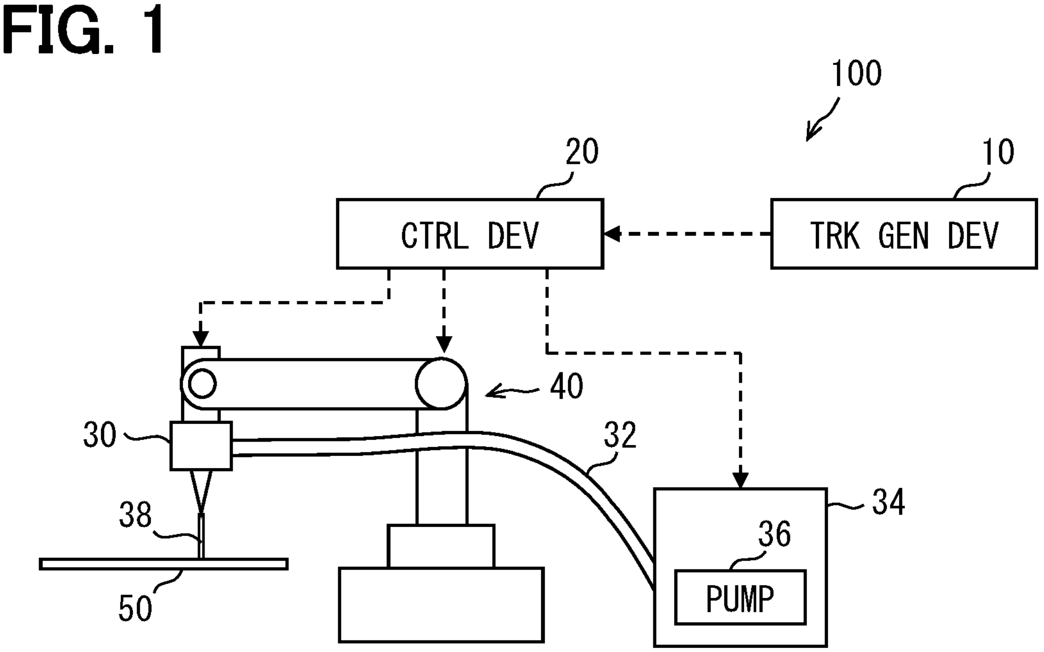
FIG. 1 is a configuration diagram schematically illustrating an overall configuration of a fluid application system including a track generation device according to a first embodiment.

Next, a relevant technology is described only for understanding the following embodiments. A discharge amount control device according to the relevant technology detects a change (decrease or increase) in application speed of an application nozzle that discharges a highly viscous fluid (for example, an adhesive), and controls the discharge amount based on the detected value.

In the discharge amount control device described above, since the application speed of the application nozzle becomes slow in a corner application portion, the discharge amount of the adhesive is reduced when the application nozzle moves from a straight application portion to the corner application portion, and the discharge amount of the adhesive is increased when the application nozzle moves from the corner application portion to the straight application portion. In such a case, it is possible to eliminate excess or deficiency of the adhesive application over the entire application portion.

In a case where the fluid discharged by the fluid discharge unit such as the application nozzle has a viscosity sufficient to maintain a state in which the fluid is connected from the fluid discharge unit to a surface of an object, there is a possibility that the fluid cannot be applied along a target application track only by determining a track of the fluid discharge unit according to the target application track. This is because the application position of the fluid discharged from the fluid discharge unit is affected by the movement of the fluid discharge unit after being discharged. For example, in a case where the fluid discharge unit changes the track from a straight track to a curved track along the target application track, the application track of the discharged fluid may curve inward from the target application track due to the influence of the fluid discharge unit moving along the curved track.

A track generation device according to an aspect of the present disclosure is configured to generating a track of a fluid discharge unit that discharges a fluid for applying the fluid to a surface of an object along a target application track. The fluid discharged by the fluid discharge unit has a viscosity that maintains a state in which the fluid is connected from the fluid discharge unit to the surface of the object. The track generation device includes a storage unit and a track generation unit. The storage unit stores a time-series model indicating a relationship between the track of the fluid discharge unit and an application track of the fluid in consideration of behavior of the fluid due to the viscosity, and the relationship is learned based on an actual track of the fluid discharge unit and an actual application track of the fluid. The track generation unit is configured to generate the track of the fluid discharge unit corresponding to the target application track using the time-series model upon reception of the target application track.

The track generation device described above is configured to generate the track of the fluid discharge unit corresponding to the target application track using the time-series model. The time-series model is learned based on the actual track of the fluid discharge unit and the actual application track of the fluid, and indicates the relationship between the track of the fluid discharge unit and the application track of the fluid in consideration of the behavior of the fluid due to the viscosity. Therefore, by using the time-series model that is learned, it is possible to generate the track of the fluid discharge unit capable of applying the fluid along the target application track.

A fluid application system according to another aspect of the present disclosure includes a fluid discharge unit, a track generation device, and a control device. The fluid discharge unit is configured to discharge a fluid for applying the fluid to a surface of an object along a target application track. The fluid discharged by the fluid discharge unit has a viscosity that maintains a state in which the fluid is connected from the fluid discharge unit to the surface of the object. The track generation device is configured to generate a track of the fluid discharge unit, and includes a storage unit and a track generation unit. The storage unit stores a time-series model indicating a relationship between the track of the fluid discharge unit and an application track of the fluid in consideration of behavior of the fluid due to the viscosity, and the relationship is learned based on an actual track of the fluid discharge unit and an actual application track of the fluid. The track generation unit is configured to generate the track of the fluid discharge unit corresponding to the target application track using the time-series model upon reception of the target application track. The control device is configured to move the fluid discharge unit along the track generated by the track generation device while making the fluid discharge unit discharge the fluid.

The fluid application system described above can apply the fluid to the surface of the object along the target application track even if the fluid has the viscosity sufficient to maintain the state in which the fluid is connected from the fluid discharge unit to the surface of the object.

A track generation device according to another aspect of the present disclosure is configured to generate a track of an application nozzle that discharges a fluid for applying the fluid to a surface of an object along a target application track. The fluid discharged by the application nozzle has a viscosity that maintains a state in which the fluid is connected from the application nozzle to the surface of the object. The track generation device includes a computer configured to: store a time-series model indicating a relationship between the track of the application nozzle and an application track of the fluid in consideration of behavior of the fluid due to the viscosity, the relationship being learned based on an actual track of the application nozzle and an actual application track of the fluid; and generate the track of the application nozzle corresponding to the target application track using the time-series model upon reception of the target application track.

Hereinafter, preferred embodiments of the present disclosure will be described with reference to the drawings. Note that the same or similar components are denoted by the same reference numerals throughout a plurality of drawings, and description thereof may be omitted.

First Embodiment

FIG. 1 is a configuration diagram schematically illustrating an overall configuration of a fluid application system 100 including a track generation device 10 according to a first embodiment. The fluid application system 100 according to the present embodiment applies a fluid 38, such as an adhesive, to a surface of an object 50, such as a workpiece, in accordance with a target application track. As illustrated in FIG. 1, the fluid 38 has a viscosity that maintains a state of being connected from the application nozzle 30 to the surface of the object 50. The application nozzle 30 corresponds to a fluid discharge unit. The fluid 38 to be applied by the fluid application system 100 according to the present embodiment is not limited to the adhesive. The fluid application system 100 according to the present embodiment can be adopted as long as the fluid 38 has the viscosity as described above.

As illustrated in FIG. 1, the fluid application system 100 includes the track generation device (TRK GEN DEV) 10, a control device (CTRL DEV) 20, the application nozzle 30, a hose 32, a tank 34, a pump 36, a robot 40, and the like.

The application nozzle 30 discharges the fluid 38 from a tip thereof toward the object 50. Inside the application nozzle 30, a control valve for controlling an application flow rate of the fluid 38 is provided. In the present embodiment, the flow rate of the fluid 38 is adjusted by the control valve so that the fluid 38 is discharged from the application nozzle 30 at a constant flow rate. The discharge of the fluid 38 from the application nozzle 30 can be started and ended by the control valve.

The tank 34 stores the fluid 38 while maintaining the viscosity of the fluid 38. The tank 34 is provided with the pump 36 that delivers the fluid 38 in the tank 34 toward the application nozzle 30. When the pump 36 is driven, the fluid 38 is supplied from the tank 34 to the application nozzle 30 via the hose 32.

The robot 40 supports the application nozzle 30 at an end of a robot arm such that the application nozzle 30 is maintained in a state of being perpendicular to the surface of the object 50. The robot 40 moves the application nozzle 30 so that an application track of the fluid 38 discharged from the application nozzle 30 onto the surface of the object 50 matches with a target application track that is instructed. At this time, for example, the robot 40 moves the application nozzle 30 at a constant speed while keeping the height of the application nozzle 30 from the surface of the object 50 constant. In the following description, a track drawn by the movement of the application nozzle 30 is referred to as a nozzle track. However, since the application nozzle 30 is supported by the robot arm, the nozzle track can also be referred to as a robot track.

The control device 20 is configured using a known computer including, for example, a CPU, a ROM, a RAM, and the like. The control device 20 outputs control signals to various actuators of the robot 40 by executing a program stored in the ROM, for example, and controls the posture and the moving direction of the robot 40. Specifically, the control device 20 controls the robot 40 so that the application nozzle 30 moves along the nozzle track generated by the track generation device 10. The control device 20 also controls the start and stop of the discharge of the fluid 38 from the application nozzle 30. A specific control process executed by the control device 20 will be described in detail later.

The track generation device 10 is configured using, for example, a known computer including a CPU, a ROM, a RAM, and the like, similarly to the control device 20. The track generation device 10 executes, for example, a program stored in the ROM to generate a nozzle track corresponding to the target application track using a time-series model described later, and provides the nozzle track to the control device 20.

Figure 2:
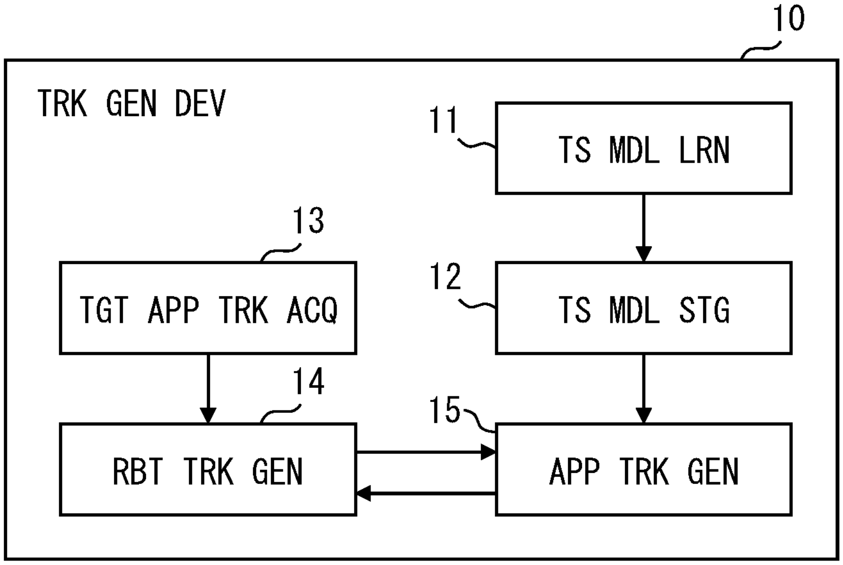
FIG. 2 is a block diagram illustrating various functions performed by the track generation device when executing a program.

FIG. 2 is a block diagram illustrating various functions performed by the track generation device 10 when executing the program. As illustrated in FIG. 2, the track generation device 10 includes a time-series model learning unit (TS MDL LRN) 11, a time-series model storage unit (TS MDL STG) 12, a target application track acquisition unit (TGT APP TRK ACQ) 13, a robot track generation unit (RBT TRK GEN) 14, and an application track generation unit (APP TRK GEN) 15. However, the time-series model learning unit 11 may be implemented in a device different from the track generation device 10, and the track generation device 10 may be configured to store the time-series model (model parameter) that is learned in the different device in the time-series model storage unit 12.

The time-series model learning unit 11 learns the model parameters of the time-series model using the track of the application nozzle 30 when the application nozzle 30 is moved while discharging the fluid 38 from the application nozzle 30 so that the application track of the fluid 38 has a predetermined pattern shape and the application track of the fluid 38 that is actually obtained as learning data. The predetermined pattern includes, for example, a combination of a linear track and a curved track. A learning accuracy of the time-series model (model parameter) is improved by obtaining a large number of pieces of learning data using a plurality of types of pattern shapes having different curve radii of the curved track.

In the present embodiment, as the time-series model, a time-series model is used in which an application position at which the fluid 38 discharged from the application nozzle 30 is applied to the surface of the object 50 is estimated from at least a plurality of planned track positions representing a planned track of the application nozzle 30 and a plurality of application track positions representing the application track of the fluid 38 that is applied to the surface of the object 50. Hereinafter, the time-series model will be described in detail.

Figure 3A:
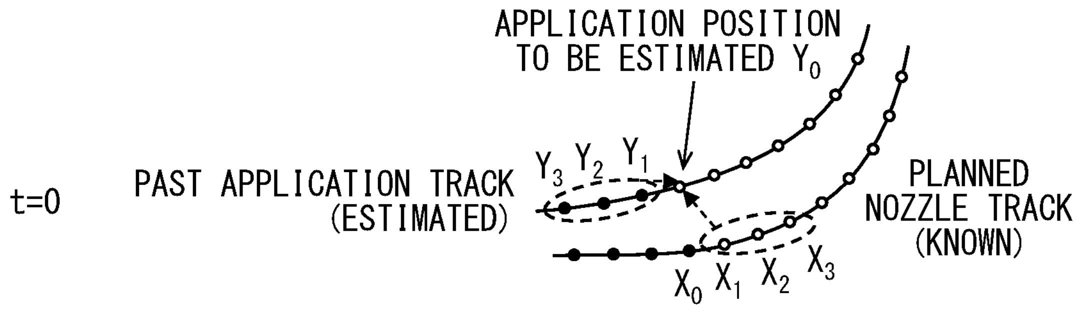
FIG. 3A is a diagram illustrating a positional relationship among an application position of a fluid to be estimated, a current position of an application nozzle, three planned track positions, and three application track positions at time t=0.

For example, as illustrated in FIG. 3A, the time-series model is configured to estimate an application position $Y_0$ to which the fluid 38 is applied according to the following Equation 1 from three planned track positions $X_1$, $X_2$, and $X_3$ representing the planned track from a current position $X_0$ of the application nozzle 30 and three application track positions $Y_1$, $Y_2$, and $Y_3$ including the latest application track position $Y_1$ and representing the application track of the fluid 38 that is applied to the surface of the object 50.

$$Y_0=\alpha+\beta_1X_1+\beta_2X_2+\beta_3X_3+\gamma_1Y_1+\gamma_2Y_2+\gamma_3Y_3+\varepsilon \quad \text{[Equation 1]}$$

In Equation 1, a is an intercept, $\beta_1$ to $\beta_3$ are weights for the planned track positions $X_1$, $X_2$, and $X_3$ of the application nozzle 30, $\gamma_1$ to $\gamma_3$ are weights for the application track positions $Y_1$, $Y_2$, and $Y_3$, and $\varepsilon$ is an error. These $\alpha$, $\beta_1$ to $\beta_3$, $\gamma_1$ to $\gamma_3$, and $\varepsilon$ are collectively referred to as model parameters. This model is an autoregressive model as an example of the time-series model.

Figure 4:
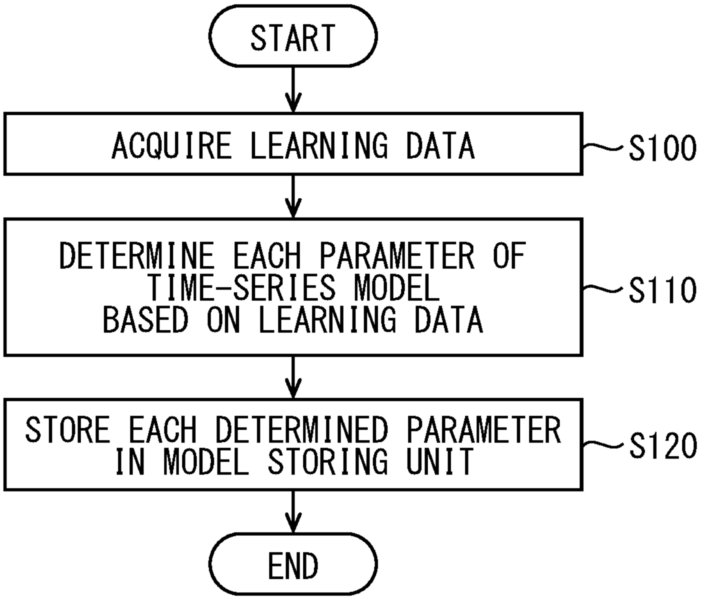
FIG. 4 is a flowchart illustrating a process for learning a time-series model, which is executed by a time-series model learning unit.

FIG. 4 is a flowchart illustrating a process for learning the time-series model, which is executed by the time-series model learning unit 11. Learning the time-series model is equivalent to estimating model parameters of the time-series model.

In S100, learning data including the track of the application nozzle 30 when the application nozzle 30 is actually moved and the application track of the fluid 38 obtained at that time is acquired from, for example, the control device 20. In S110, model parameters of the time-series model are determined based on the learning data. The model parameters can be estimated by maximum likelihood estimation using a least squares method or the like based on the learning data. As a result, the time-series model to which the estimated model parameters are applied most reliably represents the relationship between the track of the application nozzle 30 and the application track of the fluid 38 in the learning data. In S120, the learned time-series model, that is, the estimated (determined) model parameters are stored in the time-series model storage unit 12.

When the viscosity of the fluid 38, the height from the surface of the object 50 to the application nozzle 30, or the like changes, the behavior due to the viscosity of the fluid 38 also changes, and as a result, the application position of the fluid 38 also changes. Therefore, a plurality of types of time-series models may be learned and stored in the time-series model storage unit 12 for each type of the fluid 38 and/or each time an application condition such as a set value of the height of the application nozzle 30 from the surface of the object 50 or a moving speed of the application nozzle 30 is changed. In this case, an optimum time-series model may be specified according to the type of the fluid 38, the height and the moving speed of the application nozzle 30, and the like, and the specified time-series model may be read from the time-series model storage unit 12.

Here, a learning accuracy of the time-series model, in other words, an estimation accuracy of the model parameters can be increased with increase in the number of pieces of learning data. However, actually repeating the application of the fluid 38 by the fluid application system 100 in order to obtain a large amount of learning data is not an efficient method. Therefore, in the present embodiment, the learning data including the track of the application nozzle 30 when the application nozzle 30 is actually moved and the application track of the fluid 38 obtained at that time is subjected to at least one mathematical process of inversion, rotation, reduction, and enlargement to augment the learning data.

Figure 5A:
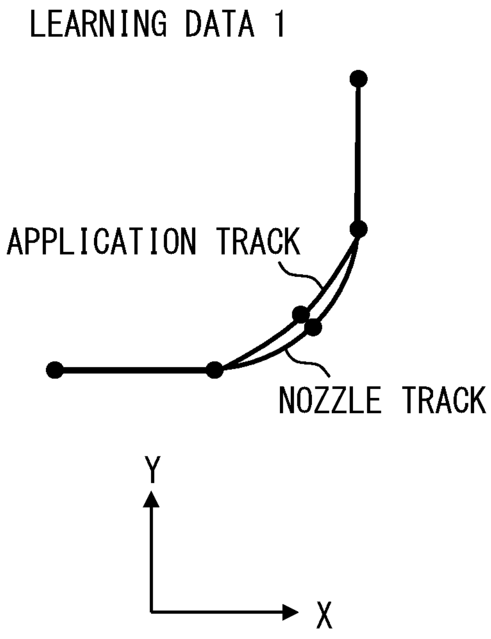
FIG. 5A is a diagram illustrating a nozzle track of an application nozzle and an actual application track of a fluid obtained as a learning data.
Figure 5B:
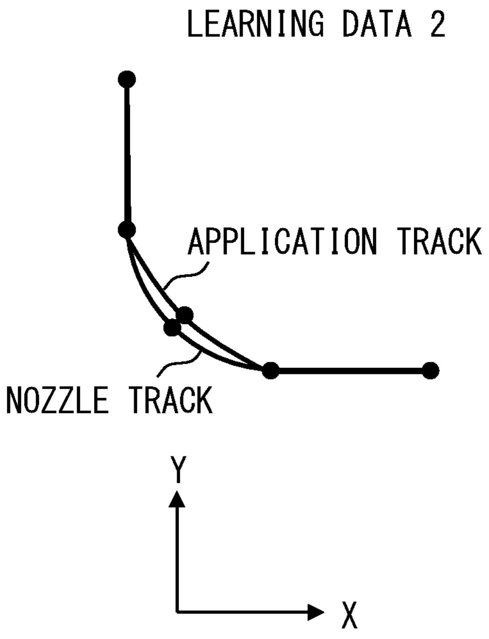
FIG. 5B is a diagram illustrating a learning data obtained by performing a mathematical process of inversion around a Y-axis with respect to the learning data illustrated in FIG. 5A.

For example, it is assumed that the nozzle track of the application nozzle 30 and the actual application track of the fluid 38 as illustrated in FIG. 5A are obtained as a learning data 1 by actually operating the fluid application system 100 and discharging the fluid 38 from the application nozzle 30 while moving the application nozzle 30 according to a predetermined pattern. For example, by performing a mathematical process of inverting the learning data 1 around a Y-axis, as illustrated in FIG. 5B, it is possible to obtain a learning data 2 that is different from the learning data 1 in rotation direction. In this way, by performing the above-described mathematical process on the learning data, it is possible to obtain a large amount of learning data without actually operating the fluid application system 100.

Regarding the learning data, it is preferable to perform a normalization process of position and/or angle on the learning data including the nozzle track of the application nozzle 30 and the application track of the fluid 38.

Figure 6A:
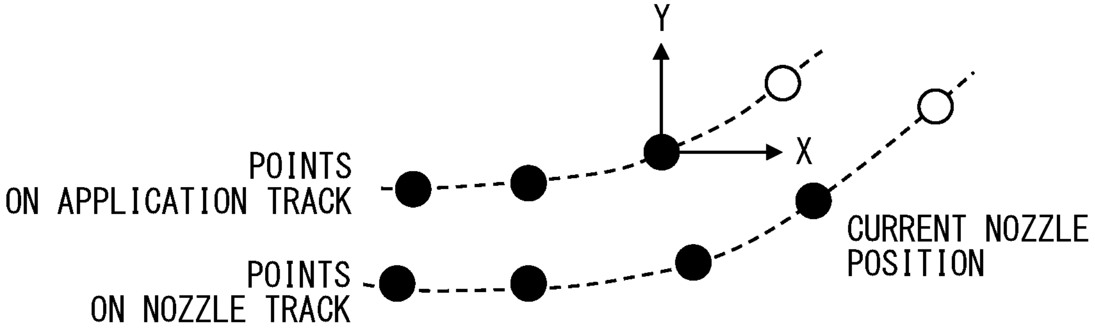
FIG. 6A is an explanatory diagram for explaining a normalization process of a position of a learning data.

The normalization process of position means, for example, as illustrated in FIG. 6A, converting the planned track positions of the application nozzle 30 and the application track positions of the fluid 38 for estimating the model parameters of the time-series model into positions in two-dimensional coordinate with the latest application position on the application track as the origin. The point serving as the origin of the two-dimensional coordinate is not limited to the latest application position on the application track. For example, the current nozzle position may be set as the origin, or the previous application position or nozzle position may be set as the origin. However, the origin is updated such that the positional relationship between the origin and the planned track positions of the application nozzle 30 and the application track positions of the fluid 38 for estimating the model parameters of the time-series model is maintained each time estimation of a new application position is repeated by the time-series model.

Figure 6B:
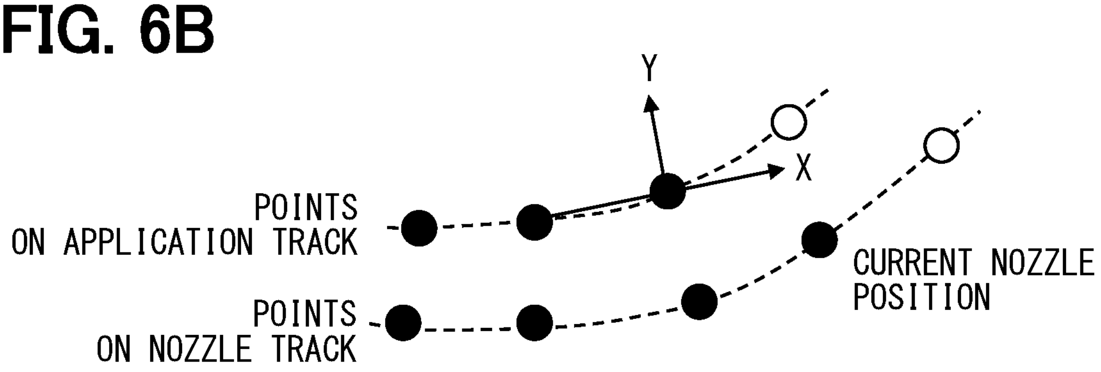
FIG. 6B is an explanatory diagram for explaining a normalization process of an angle of the learning data.

The normalization process of angle means, for example, as illustrated in FIG. 6B, that a direction of one axis of two-dimensional coordinate (a direction of an x-axis in FIG. 6B) is aligned with a moving direction of the position serving as the origin (that is, the moving direction of the position of the application nozzle 30 or the moving direction of the application position of the fluid 38). The moving direction of the application position of the fluid 38 can be defined, for example, as shown in FIG. 6B, by a straight line connecting the application position serving as the origin and the application position immediately before the origin. When the position of the application nozzle 30 is set as the origin, the moving direction of the position of the application nozzle 30 may be defined by a straight line connecting the nozzle position set as the origin and the nozzle position immediately before the origin.

By performing such normalization process of position and/or angle, the position dependency and/or angle dependency of the learning data is eliminated, and the values of the learning data can be handled uniformly without depending on the shape of the nozzle track and/or the application track. Therefore, the learning accuracy of the time-series model can be improved.

By using the time-series model learned in this manner, the application track generation unit 15 can obtain the application track of the fluid 38 with respect to the planned track of the application nozzle 30. Hereinafter, an example of a specific method of estimating the application track of the fluid 38 with respect to the planned track of the application nozzle 30 will be described with reference to FIGS. 3A to 3C.

Figure 3B:
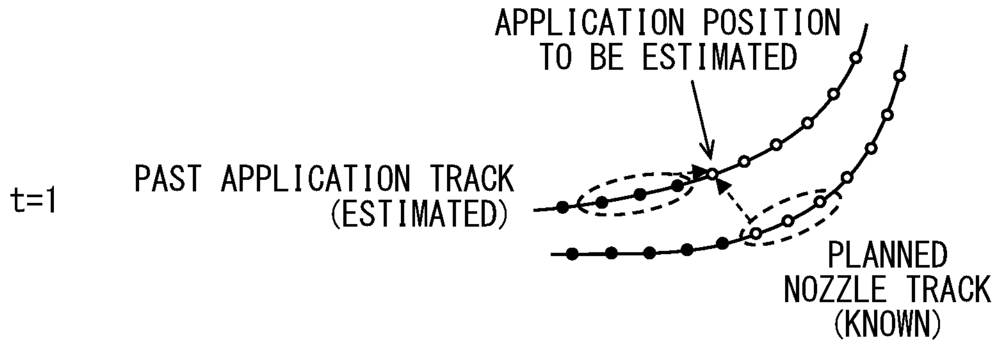
FIG. 3B is a diagram illustrating a positional relationship among an application position of the fluid to be estimated, a current position of the application nozzle, three planned track positions, and three application track positions at time t=1.
Figure 3C:
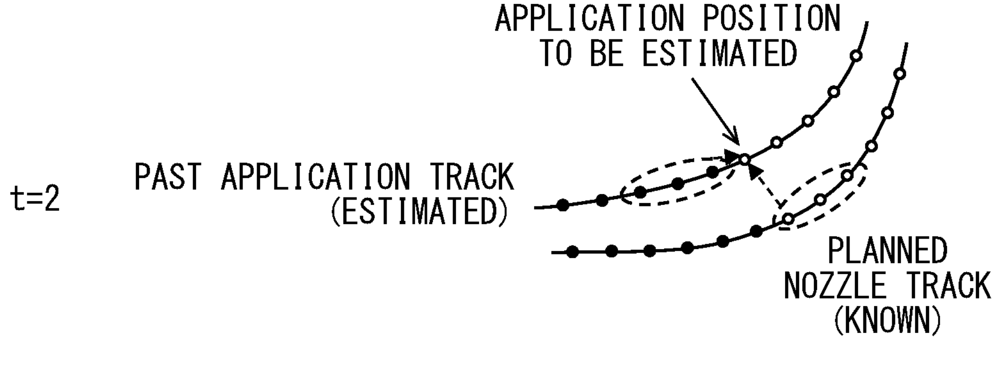
FIG. 3C is a diagram illustrating a positional relationship among an application position of the fluid to be estimated, a current position of the application nozzle, three planned track positions, and three application track positions at time t=2.

FIG. 3A shows the positional relationship between the application position $Y_0$ of the fluid 38 to be estimated, the current position $X_0$ of the application nozzle 30, the three planned track positions $X_1$, $X_2$, and $X_3$, and the three application track positions $Y_1$, $Y_2$, and $Y_3$ at time t=0. FIG. 3B shows the positional relationship between the application position $Y_0$ of the fluid 38 to be estimated, the current position $X_0$ of the application nozzle 30, the three planned track positions $X_1$, $X_2$, and $X_3$, and the three application track positions $Y_1$, $Y_2$, and $Y_3$ at time t=1 when a predetermined time has elapsed from the time t=0 or when the nozzle position has moved by a predetermined distance. FIG. 3C shows the positional relationship between the application position $Y_0$ of the fluid 38 to be estimated, the current position $X_0$ of the application nozzle 30, the three planned track positions $X_1$, $X_2$, and $X_3$, and the three application track positions $Y_1$, $Y_2$, and $Y_3$ at time t=2 when the predetermined time has elapsed from the time t=1 or when the nozzle position has moved by the predetermined distance.

As illustrated in FIGS. 3A to 3C, in the present embodiment, the application track generation unit 15 repeatedly estimates the application position $Y_0$ of the fluid 38 every time the predetermined time elapses or every time the nozzle position moves by the predetermined distance using the time-series model. At this time, each time the estimation of the application position $Y_0$ of the fluid 38 is repeated, the application track generation unit 15 updates the plurality of planned track positions $X_1$, $X_2$, and $X_3$ and the plurality of application track positions $Y_1$, $Y_2$, and $Y_3$ to be substituted into the time-series model along the estimated application track so as to trace the planned track of the application nozzle 30 and the estimated application position $Y_0$ of the fluid 38, respectively.

By repeating the estimation of the application position $Y_0$ of the fluid 38 by the application track generation unit 15 in this manner, the application track generation unit 15 can estimate the application track of the fluid 38 obtained when the application nozzle 30 is moved along the planned track.

Note that the number of the planned track positions $X_1$, $X_2$, and $X_3$ and the application track positions $Y_1$, $Y_2$, and $Y_3$ as the time-series data included in the time-series model is not limited to three. That is, the number of planned track positions and the number of application track positions may be, for example, two or four or more. The number of planned track positions and the number of application track positions may be the same or different. Furthermore, the time-series model may include variables other than the above-described time-series data and model parameters.

The time-series model described above can be easily modeled because it is not necessary to mathematize the physical behavior of the application nozzle 30 or the fluid 38. Furthermore, there is an advantage that it is possible to cope with unlearned behavior by the robustness of the time-series model.

Figure 7:
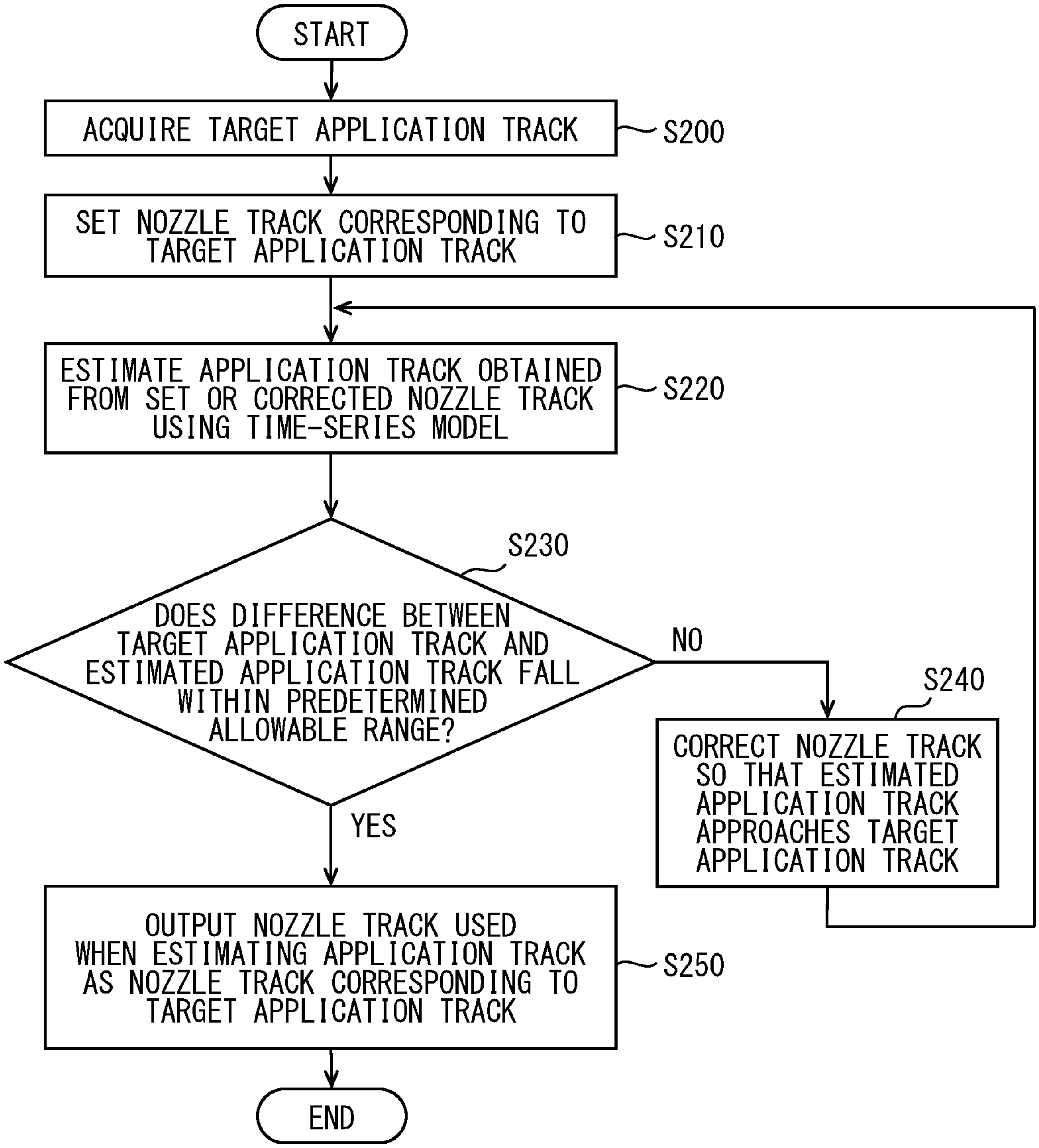
FIG. 7 is a flowchart illustrating a process for generating a nozzle track corresponding to a target application track using a time-series model, which is executed by the track generation device.

Next, a process for generating the nozzle track corresponding to the target application track using the time-series model, which is executed in the track generation device 10, will be described with reference to the flowchart of FIG. 7.

In S200, the target application track acquisition unit 13 acquires the target application track of the fluid 38 applied to the surface of the object 50. The target application track is input to the track generation device 10 by an operator, for example.

In S210, the robot track generation unit 14 initially sets the track of the application nozzle 30 (that is, the robot track) so as to match with the target application track that is acquired.

In S220, the application track generation unit 15 estimates the application track of the fluid 38 obtained when the application nozzle 30 is moved along the set track while discharging the fluid 38 using the time-series model stored in the time-series model storage unit 12. In the estimation of the application track of the fluid 38, as described above, the application positions of the plurality of fluids 38 are estimated while updating the plurality of planned track positions $X_1$, $X_2$, and $X_3$ and the plurality of application track positions $Y_1$, $Y_2$, and $Y_3$ to be substituted into the time-series model along the set track of the application nozzle 30 and the application track of the fluid 38. The application track of the fluid 38 is estimated to trace the plurality of estimated application positions of the fluid 38.

In S230, the robot track generation unit 14 compares the application track of the fluid 38 estimated by the application track generation unit 15 with the acquired target application track, and determines whether or not the difference between the estimated application track and the target application track falls within a predetermined allowable range.

Figure 8A:
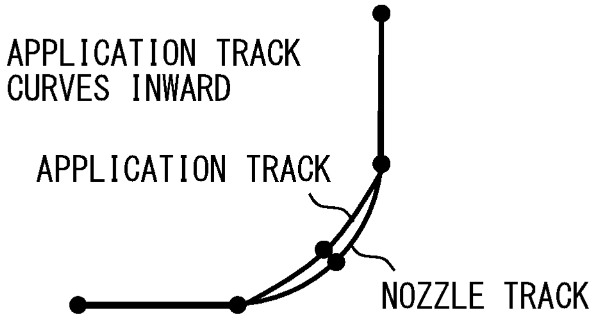
FIG. 8A is a diagram illustrating an example in which an application track of the fluid is deviated from a track of the application nozzle.

Here, when the fluid 38 discharged by the application nozzle 30 has a viscosity sufficient to maintain a state of being connected from the application nozzle 30 to the surface of the object 50, the application track of the fluid 38 may deviate from the track of the application nozzle 30. For example, as shown in FIG. 8A, when the application nozzle 30 changes the track from a straight track to another straight track through a curved track, the application track may curve inward with respect to the nozzle track in the curved track of the application nozzle 30. This is because since the fluid 38 discharged from the application nozzle 30 is connected to the application nozzle 30, the discharged fluid 38 is pulled to the inside of the curved track of the application nozzle 30 due to the influence of the application nozzle 30 moving along the curved track. Therefore, there may be a case where the application track obtained by the track of the application nozzle 30 that is set to match with the target application track does not match with the target application track.

Therefore, when it is determined that the difference between the estimated application track and the target application track exceeds the predetermined allowable range in S230 described above, the process proceeds to S240, and the robot track generation unit 14 corrects the track of the application nozzle 30 so that the difference between the estimated application track and the target application track becomes small, in other words, so that the estimated application track approaches the target application track. Then, the application track generation unit 15 acquires the corrected nozzle track from the robot track generation unit 14, and estimates the application track obtained by the corrected track of the application nozzle 30 in the process of S220.

Figure 8B:
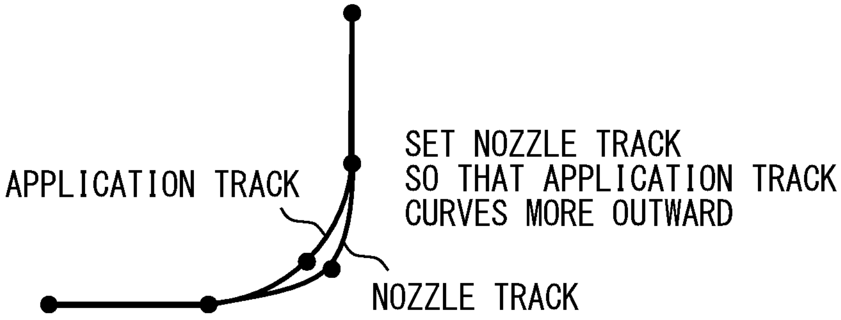
FIG. 8B is a diagram illustrating an example in which the track of the application nozzle is corrected so that an estimated application track approaches the target application track.

For example, as shown in FIG. 8A, in a case where the estimated application track curves inward with respect to the nozzle track in the curved track of the application nozzle 30, the track of the application nozzle 30 is corrected so that the estimated application track curves more outward. Specifically, as shown in FIG. 8B, the track of the application nozzle 30 is corrected so as to be more outward than the initial track. By correcting the track of the application nozzle 30 in this way, as shown in FIG. 8B, the estimated application track can be made closer to the target application track.

When the robot track generation unit 14 determines that the difference between the estimated application track and the target application track falls within the predetermined allowable range in S230, the track of the application nozzle 30 used when the estimated application track is obtained is determined as the track of the application nozzle 30 (robot track) corresponding to the target application track in S250. The determined track of the application nozzle 30 is output to the control device 20.

Figure 9:
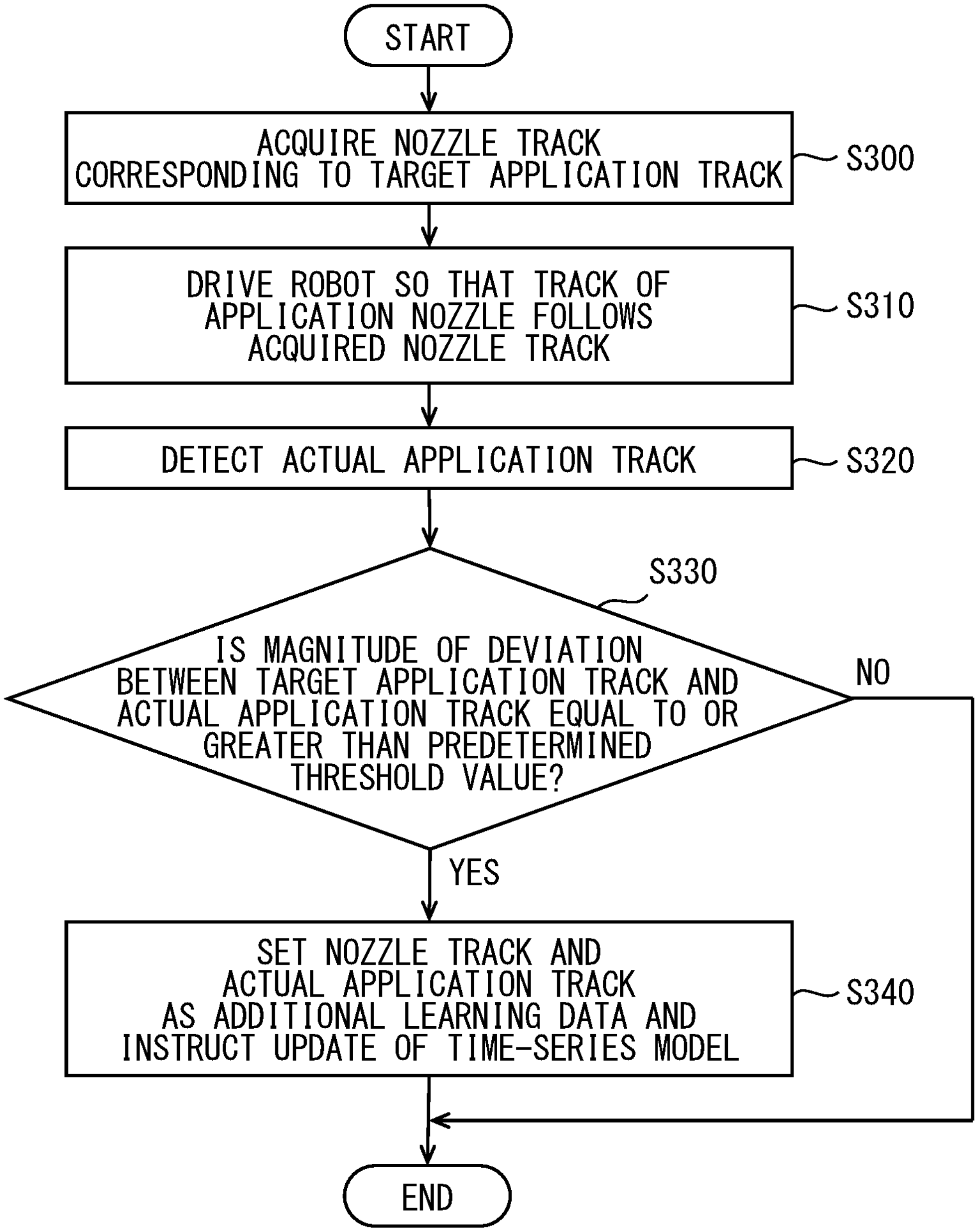
FIG. 9 is a flowchart illustrating a process for controlling a robot so that the application nozzle moves along the track of the application nozzle generated by the track generation device, which is executed by the control device.

Next, a process for controlling the robot 40 so that the application nozzle 30 is moved along the track of the application nozzle 30 generated by the track generation device 10, which is executed in the control device 20, will be described with reference to the flowchart of FIG. 9.

In S300, the control device 20 acquires the track of the application nozzle 30 corresponding to the target application track from the track generation device 10. In S310, the control device 20 outputs a control signal for driving the robot 40 based on the acquired track of the application nozzle 30 so that the track of the application nozzle 30 follows the acquired track. The control device 20 controls the control valve of the application nozzle 30 so that the fluid 38 of a constant flow rate is discharged from the application nozzle 30 while the application nozzle 30 is moved along the acquired nozzle track. As a result, normally, the application track of the fluid 38 that is applied to the object 50 matches with the target application track.

However, for example, even in a case where the type of the fluid 38 is the same, there may be a case where the actual application track of the fluid 38 does not match with the target application track even when the application nozzle 30 is moved along the acquired nozzle track due to deterioration of the fluid 38, environmental change such as a temperature change and a humidity change, or the like.

In order to cope with the above-described issue, in S320, the application track of the fluid 38 actually applied to the surface of the object 50 is detected using a detector such as a camera. Then, in S330, it is determined whether the magnitude of the deviation between the actual application track and the target application track is equal to or greater than a predetermined threshold value. In this determination process, when it is determined that the magnitude of the deviation between the actual application track and the target application track is equal to or greater than the predetermined threshold value, the process of S340 is executed. In S340, the control device 20 instructs the time-series model learning unit 11 of the track generation device 10 to update the learning data so as to add the nozzle track used for controlling the robot 40 and the actual application track to the learning data, and to update the time-series model by performing relearning of the time-series model on the basis of the updated learning data.

Accordingly, even when deterioration of the fluid 38, the environmental change such as the temperature change or the humidity change, or the like occurs, the time-series model can be adapted to the environmental change or the like by updating the time-series model. Therefore, by using the updated time-series model, it is possible to apply the fluid 38 to the object 50 so as to match the target application track.

The processes of S320 to S340 may be executed only for a predetermined period from the start of the operation of the fluid application system 100. This is because, if there is no deviation between the target application track and the actual application track due to an influence of the environmental change or the like at the start of operation of the fluid application system 100, there is a low possibility that a deviation between the target application track and the actual application track occurs due to an influence of the environmental change or the like during subsequent operation of the fluid application system 100. However, the processes of S320 to S340 may be continuously executed during the operation of the fluid application system 100.

Furthermore, a predetermined period from the start of the operation of the fluid application system 100 may be set as an acquisition period of learning data regardless of whether or not there is a deviation between the target application track and the actual application track, and the time-series model may be updated based on the learning data to which the learning data acquired in the acquisition period is added.

As described above, as the predetermined update condition for instructing the update of the time-series model, it is possible to adopt the occurrence of the deviation between the target application track and the actual application track, the start of the operation of the fluid application system 100, or the like.

Second Embodiment

Next, a fluid application system 100 including a track generation device 110 according to a second embodiment of the present disclosure will be described. Since the overall configuration of the fluid application system 100 according to the present embodiment is similar to the overall configuration of the fluid application system 100 according to the first embodiment, the description thereof will be omitted.

The above-described first embodiment adopts the time-series model in which the application position at which the fluid 38 discharged from the application nozzle 30 is applied to the surface of the object 50 is estimated from at least the plurality of planned track positions representing the planned track of the application nozzle 30 and the plurality of application track positions representing the application track of the fluid 38 applied to the surface of the object 50.

Figure 10:
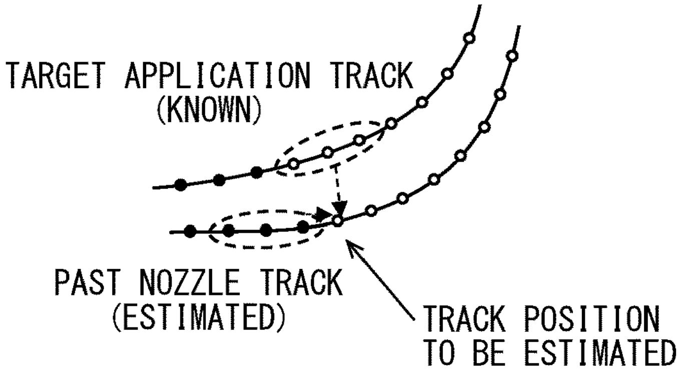
FIG. 10 is an explanatory diagram for explaining a time-series model used in a second embodiment.

On the other hand, the present embodiment adopts, as shown in FIG. 10, a time-series model in which a position to which the application nozzle 30 should move is estimated at least from a plurality of application track positions representing a target application track to which the fluid 38 should be applied following the application track of the fluid 38 applied to the surface of the object 50 and a plurality of past track positions representing a past track including the latest past track position of the application nozzle 30.

Figure 11:
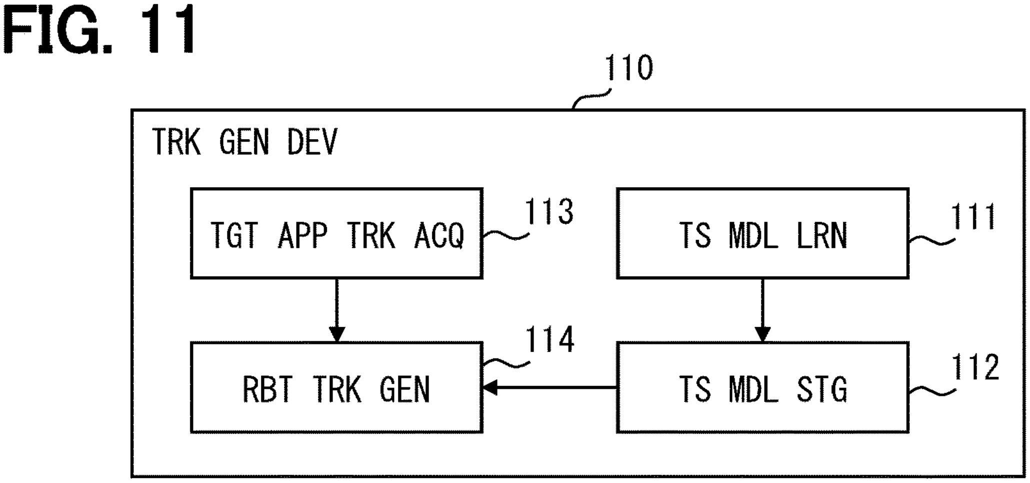
FIG. 11 is a block diagram illustrating various functions performed by the track generation device according to the second embodiment when executing a program.

Then, using the time-series model described above, a robot track generation unit (RBT TRK GEN) 114 illustrated in FIG. 11 repeatedly estimates the position to which the application nozzle 30 should move every time a predetermined time elapses or every predetermined distance. At this time, each time the robot track generation unit 114 repeats the estimation of the position to which the application nozzle 30 should move, the plurality of application track positions and the plurality of past track positions to be substituted into the time-series model are updated along the target application track and the past nozzle track, respectively.

In this manner, the robot track generation unit 114 repeats the estimation of the position to which the application nozzle 30 should move, and thus the robot track generation unit 114 can estimate the track of the application nozzle 30 for obtaining the target application track on the basis of the target application track. Configurations and functions other than the track generation device 110 of the second embodiment are similar to those of the first embodiment.

FIG. 11 is a block diagram illustrating various functions performed by the track generation device (TRK GEN DEV) 110 according to the second embodiment when executing a program. As illustrated in FIG. 11, the track generation device 110 includes a time-series model learning unit (TS MDL LRN) 111, a time-series model storage unit (TS MDL STG) 112, a target application track acquisition unit (TGT APP TRK ACQ) 113, and a robot track generation unit (RBT TRK GEN) 114. In the track generation device 110 according to the present embodiment, as described above, the robot track generation unit 114 directly estimates the track of the application nozzle 30 from the target application track. Therefore, the track generation device 110 according to the second embodiment does not include a configuration corresponding to the application track generation unit 15 of the track generation device 10 according to the first embodiment.

Similarly to the time-series model learning unit 11 of the track generation device 10 according to the first embodiment, the time-series model learning unit 111 learns the model parameters of the time-series model using, as learning data, the track of the application nozzle 30 when the application nozzle 30 is moved while discharging the fluid 38 from the application nozzle 30 so that the application track of the fluid 38 has a predetermined pattern shape and the actually obtained application track of the fluid 38. The learned time-series model (model parameters) is stored in the time-series model storage unit 112.

However, the time-series model of the second embodiment is different from the time-series model of the first embodiment in that the output is the position to which the application nozzle 30 should move, and the input time-series data is the plurality of application track positions representing the target application track to which the fluid 38 should be applied following the application track of the fluid 38 applied to the surface of the object 50, and the plurality of past track positions representing the past track including the latest past track position of the application nozzle 30.

Figure 12:
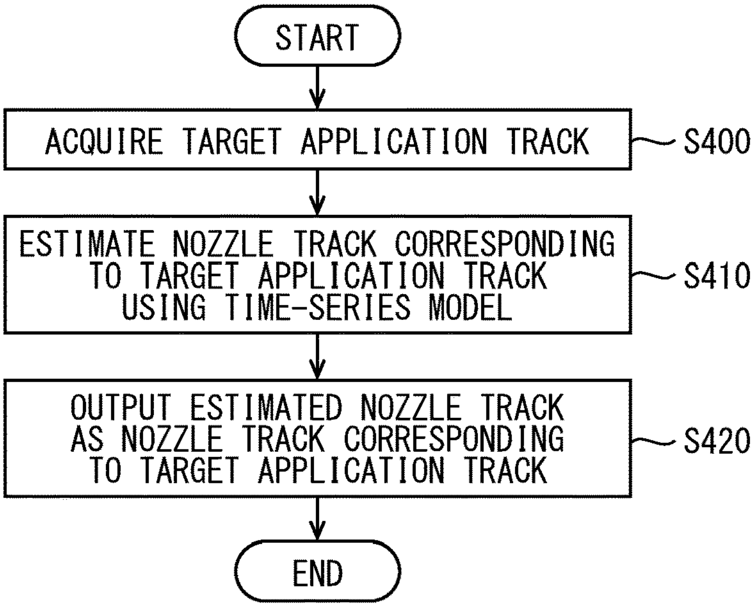
FIG. 12 is a flowchart illustrating a process for generating a nozzle track corresponding to a target application track using the time-series model, which is executed by the track generation device according to the second embodiment.

Next, a process for generating the nozzle track corresponding to the target application track using the time-series model, which is executed in the track generation device 110 according to the second embodiment, will be described with reference to a flowchart of FIG. 12.

In S400, the target application track acquisition unit 113 acquires the target application track of the fluid 38 applied to the surface of the object 50. The target application track is input to the track generation device 110 by an operator, for example.

In S410, the robot track generation unit 114 estimates the track of the application nozzle 30 corresponding to the acquired target application track using the time-series model stored in the time-series model storage unit 112. When estimating the track of the application nozzle 30, the robot track generation unit 114 estimates the positions to which the application nozzle 30 should move while updating the plurality of application track positions and the plurality of past track positions to be substituted into the time-series model along the target application track and the past nozzle track, respectively, as described above. The track of the application nozzle 30 corresponding to the acquired target application track is estimated to trace the estimated positions to which the application nozzle 30 should move.

In S420, the robot track generation unit 114 determines the estimated track of the application nozzle 30 as a nozzle track corresponding to the target application track, and outputs the nozzle track to the control device 20.

While preferred embodiments of the present disclosure have been described above, the present disclosure is not limited in any way by the embodiments described above, and may be carried out with various modifications without departing from the scope of the subject matter of the present disclosure.

For example, the computer constituting the track generation devices 10 and 110 and/or the control device 20 may be realized by a dedicated computer having a processor programmed to execute one or more functions by a computer program. Alternatively, the computer constituting the track generation devices 10 and 110 and/or the control device 20 may be realized by a dedicated hardware logic circuit. Alternatively, the computer constituting the track generation devices 10 and 110 and/or the control device 20 may be realized by one or more dedicated computers configured by a combination of a processor that executes a computer program and one or more hardware logic circuits. The hardware logic circuit is, for example, an application specific integrated circuit (ASIC) or a field-programmable gate array (FPGA).

The storage medium for storing the computer program is not limited to the ROM. Furthermore, the computer program may be stored in a computer-readable non-transitionary tangible storage medium as an instruction executed by the computer. For example, the program may be stored in a flash memory. Furthermore, the form of the storage medium may be changed as appropriate. The storage medium is not limited to a configuration provided on a circuit board, and may be an optical disk, a hard disk drive, a memory card, or the like.

In the above-described embodiments, the application nozzle 30 corresponds to a fluid discharge unit. The time-series model storage unit 12 and the time-series model storage unit 112 correspond to a storage unit. The robot track generation unit 14, the application track generation unit 115, and the robot track generation unit 114 correspond to a track generation unit. The process in S210 corresponds to a track setting unit. The process in S220 corresponds to an application track estimation unit. The process in S240 corresponds to a track correction unit. The process in S250 and the processes in S410 and S420 correspond to a track output unit. The process in S320 corresponds to a detection unit. The process in S340 corresponds to an update instruction unit.

What is claimed is:

1. A track generation device for generating a track of a fluid discharge unit that discharges a fluid for applying the fluid to a surface of an object along a target application track, the fluid discharged by the fluid discharge unit having a viscosity that maintains a state in which the fluid is connected from the fluid discharge unit to the surface of the object, the track generation device comprising:

a storage unit storing a time-series model indicating a relationship between the track of the fluid discharge unit and an application track of the fluid in consideration of behavior of the fluid due to the viscosity, the relationship being learned based on an actual track of the fluid discharge unit and an actual application track of the fluid; and a track generation unit configured to generate the track of the fluid discharge unit corresponding to the target application track using the time-series model upon reception of the target application track.

2. The track generation device according to claim 1, wherein the time-series model is configured to estimate an application position at which the fluid discharged from the fluid discharge unit is applied to the surface of the object from at least a plurality of planned track positions representing a planned track of the fluid discharge unit and a plurality of application track positions representing an application track of the fluid that is applied to the surface of the object.

3. The track generation device according to claim 2, wherein the track generation unit includes:

a track setting unit configured to determine the track of the fluid discharge unit corresponding to the target application track upon reception of the target application track;

an application track estimation unit configured to estimate the application track of the fluid obtained when the fluid discharge unit is moved along the track determined by the track setting unit by repeating estimation of an application position of the fluid using the time-series model while updating the plurality of planned track positions and the plurality of application track positions along the track of the fluid discharge unit determined by the track setting unit and the application track of the fluid that is applied to the surface of the object;

a track correction unit configured to correct the track of the fluid discharge unit so as to reduce a difference between the application track estimated by the application track estimation unit and the target application track when the difference exceeds a predetermined allowable range; and a track output unit configured to output the track of the fluid discharge unit that is used when the application track is estimated as the track of the fluid discharge unit corresponding to the target application track when the difference between the application track estimated by application track estimation unit and the target application track is within the predetermined allowable range.

4. The track generation device according to claim 1, wherein the time-series model is configured to estimate a position to which the fluid discharge unit should move from at least a plurality of application track positions representing the target application track on which the fluid should be applied following the application track of the fluid that is applied to the surface of the object and a plurality of past track positions representing a past track of the fluid discharge unit.

5. The track generation device according to claim 4, wherein the track generation unit includes a track output unit configured to:

estimate the track of the fluid discharge unit corresponding to the target application track by repeating estimation of the position to which the fluid discharge unit should move using the time-series model while updating the plurality of application track positions and the plurality of past track positions along the target application track and the past track of the fluid discharge unit; and output the track that is estimated.

6. The track generation device according to claim 1, wherein in the time-series model, the track of the fluid discharging unit when the fluid discharging unit is moved while discharging the fluid from the fluid discharging unit such that the application track of the fluid has a predetermined pattern shape and an actually obtained application track of the fluid are learned as learning data, and the learning data is augmented by at least one mathematical process of inversion, rotation, reduction, and enlargement with respect to the track of the fluid discharge unit when the fluid discharge unit is moved and the actually obtained application track of the fluid.

7. The track generation device according to claim 1, wherein in the time-series model, the track of the fluid discharging unit when the fluid discharging unit is moved while discharging the fluid from the fluid discharging unit such that the application track of the fluid has a predetermined pattern shape and an actually obtained application track of the fluid are learned as learning data, and the learning data is converted into a position in two-dimensional coordinate with a position of the fluid discharge unit or an application position of the fluid as an origin, and the origin is updated every time estimation of the position is repeated by the time-series model.

8. The track generation device according to claim 7, wherein a direction of one axis of the two-dimensional coordinate is aligned with a moving direction of the position of the fluid discharge unit or a moving direction of the application position of the fluid.

9. The track generation device according to claim 1, further comprising:

a detection unit configured to detect the actual application track of the fluid when the fluid discharge unit is moved in accordance with the track of the fluid discharge unit corresponding to the target application track generated by the track generation unit; and an update instruction unit configured to instruct update of the time-series model using the actual application track detected by the detection unit and the track of the fluid discharge unit as learning data when a predetermined update condition is satisfied.

10. A fluid application system comprising:

a fluid discharge unit configured to discharge a fluid for applying the fluid to a surface of an object along a target application track, the fluid discharged by the fluid discharge unit having a viscosity that maintains a state in which the fluid is connected from the fluid discharge unit to the surface of the object;

a track generation device configured to generate a track of the fluid discharge unit, and including a storage unit storing a time-series model indicating a relationship between the track of the fluid discharge unit and an application track of the fluid in consideration of behavior of the fluid due to the viscosity, the relationship being learned based on an actual track of the fluid discharge unit and an actual application track of the fluid, and a track generation unit configured to generate the track of the fluid discharge unit corresponding to the target application track using the time-series model upon reception of the target application track; and a control device configured to move the fluid discharge unit along the track generated by the track generation device while making the fluid discharge unit discharge the fluid.

11. A track generation device for generating a track of an application nozzle that discharges a fluid for applying the fluid to a surface of an object along a target application track, the fluid discharged by the application nozzle having a viscosity that maintains a state in which the fluid is connected from the application nozzle to the surface of the object, the track generation device comprising a computer configured to:

store a time-series model indicating a relationship between the track of the application nozzle and an application track of the fluid in consideration of behavior of the fluid due to the viscosity, the relationship being learned based on an actual track of the application nozzle and an actual application track of the fluid; and generate the track of the application nozzle corresponding to the target application track using the time-series model upon reception of the target application track.

* * * * *